United States Patent
Blank et al.

(10) Patent No.: US 6,496,823 B2
(45) Date of Patent: Dec. 17, 2002

(54) APPORTIONING A WORK UNIT TO EXECUTE IN PARALLEL IN A HETEROGENEOUS ENVIRONMENT

(75) Inventors: Ted Eric Blank, San Jose, CA (US); Tammie Dang, Morgan Hill, CA (US); Fen-Ling Lin, San Jose, CA (US); Randy Mitchell Nakagawa, San Jose, CA (US); Bryan Frederick Smith, Morgan Hill, CA (US); Craig Leonard Sutton, Palo Alto, CA (US); Darren Benjamin Swank, Poughkeepsie, NY (US); Hong Sang Tie, San Jose, CA (US); Dino Carlo Tonelli, Marlboro, NY (US); Annie S. Tsang, Saratoga, CA (US); Kouhorng Allen Yang, Saratoga, CA (US); Kathryn Ruth Zeidenstein, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/159,418

(22) Filed: Sep. 24, 1998

(65) Prior Publication Data

US 2002/0023069 A1 Feb. 21, 2002

Related U.S. Application Data

(60) Provisional application No. 60/064,753, filed on Nov. 7, 1997.

(51) Int. Cl.[7] .............................................. G06F 15/163
(52) U.S. Cl. ................................. 707/10; 707/3; 707/2; 709/106; 709/107; 709/109; 709/201
(58) Field of Search .................... 707/3, 2, 10; 709/201, 709/109, 107, 106

(56) References Cited

U.S. PATENT DOCUMENTS

| | | | |
|---|---|---|---|
| 4,403,286 A | 9/1983 | Fry et al. | 364/200 |
| 5,271,003 A | 12/1993 | Lee et al. | 370/58.2 |
| 5,283,897 A | 2/1994 | Georgiadis et al. | 395/650 |

(List continued on next page.)

FOREIGN PATENT DOCUMENTS

WO    WO 97/04384    2/1997

OTHER PUBLICATIONS

"Dynamic Load Sharing for Distributed Computing Environment", IBM® Technical Disclosure Bulletin, 38(7):511–515 (Jul. 1995).
"Workload Balancing in a Distributed Environment," IBM® Technical Disclosure Bulletin, 38(11):273–276 (Nov. 1995).
"Data–Dependent Workload Balancing", IBM® Technical Disclosure Bulletin, 39(1):65–68 (Jan. 1996).
"Rendering OpenGL in a Processor Subsystem", IBM® Technical Disclosure Bulletin, 39(3):137–139 (Mar. 1996).
"Scheduling Enhancement—Process Locking" IBM® Technical Disclosure Bulletin, 39(8):227–229 (Aug. 1996).
Kerin, R. et al., "Product Hierarchy and Brand Strategy Influences on the Order of Entry Effect for Consumer Packaged Goods", J. Prod. Innov Manag, 13:21–34 (1996).

Primary Examiner—Jean R. Homere
(74) Attorney, Agent, or Firm—Sughrue Mion Zinn Macpeak & Seas, PLLC

(57) ABSTRACT

A method, apparatus, and article of manufacture for a computer-implemented apportioning system. Work is distributed to processors in a multi-processor system. Initially, during bind-time, a scaling factor is determined for each processor. The scaling factor represents relative processing power in relation to each other processor. Then, portions of a total amount of work are distributed to each processor based on the determined scaling factor of that processor and a determined amount of work for an average processor.

43 Claims, 8 Drawing Sheets

U.S. PATENT DOCUMENTS

| | | | |
|---|---|---|---|
| 5,325,525 A | * 6/1994 | Shan et al. | 364/281 |
| 5,369,570 A | 11/1994 | Parade | 364/401 |
| 5,535,322 A | 7/1996 | Hecht | 395/155 |
| 5,537,319 A | 7/1996 | Schoen | 364/421 |
| 5,581,737 A | 12/1996 | Dahlen et al. | 395/497.01 |
| 5,590,319 A | 12/1996 | Cohen et al. | 395/600 |
| 5,630,129 A | * 5/1997 | Wheat | 709/105 |
| 5,694,602 A | * 12/1997 | Smith | 709/105 |
| 5,898,870 A | * 4/1999 | Okuda et al. | 709/104 |
| 5,970,495 A | * 10/1999 | Baru et al. | 707/102 |
| 6,058,267 A | * 5/2000 | Kanai et al. | 395/800.28 |
| 6,185,601 B1 | * 2/2001 | Wolff | 709/203 |

* cited by examiner

FIG. 5A

| DB2 System | Processors | Single Processor Speed (MIPS) | Total (MIPS) |
|---|---|---|---|
| A | 8 | 200 | 1600 |
| B | 8 | 100 | 800 |
| C | 4 | 100 | 400 |
|  | 20 |  | 2800 |

FIG. 5B

| DB2 System | Scaling factor |
|---|---|
| A | 1.428=200 MIPS/140 MIPS |
| B | 0.714=100 MIPS/140 MIPS |
| C | 0.714=100 MIPS/140 MIPS |

FIG. 5C

| DB2 System | Amount of Work Average Processors in DB2 System | Amount of Work Actual Processors in DB2 System | Desired Tasks |
|---|---|---|---|
| A | 40=8*5 | 57.13=8*5*1.428 | 8 |
| B | 40=8*5 | 28.57=8*5*0.714 | 8 |
| C | 20=4*5 | 14.29=4*5*0.714 | 4 |

FIG. 6A

| DB2 System | Processors | Single Processor Speed (MIPS) | Total (MIPS) |
|---|---|---|---|
| A | 8 | 200 | 1600 |
| B | 8 | 100 | 800 |
| C | 4 | 100 | 400 |
| D | 5 | 50 | 250 |
|  | 25 |  | 3050 |

FIG. 6B

| DB2 System | Scaling factor |
|---|---|
| A | 1.639=200 MIPS/122 MIPS |
| B | 0.820=100 MIPS/122 MIPS |
| C | 0.820=100 MIPS/122 MIPS |
| D | 0.410=50 MIPS/122 MIPS |

FIG. 6C

| DB2 System | Amount of Work Average Processors in DB2 System | Amount of Work Actual Processors in DB2 System | Desired Tasks |
|---|---|---|---|
| A | 32=8*4 | 52.46=8*4*1.639 | 8 |
| B | 32=8*4 | 26.23=8*4*0.820 | 8 |
| C | 16=4*4 | 13.11=4*4*0.820 | 4 |
| D | 20=5*4 | 8.20=5*4*0.410 | 5 |

FIG. 7A

| DB2 System | Processors | Single Processor Speed (MIPS) | Total (MIPS) |
|---|---|---|---|
| A | 8 | 200 | 1600 |
| B | 8 | 100 | 800 |
| C | 0 | 100 | 0 |
|  | 16 |  | 2400 |

FIG. 7B

| DB2 System | Scaling factor |
|---|---|
| A | 1.333=200 MIPS/150 MIPS |
| B | 0.666=100 MIPS/150 MIPS |

FIG. 7C

| DB2 System | Amount of Work Average Processors in DB2 System | Amount of Work Actual Processors in DB2 System | Desired Tasks |
|---|---|---|---|
| A | 50=8*6.25 | 66.66=8*6.25*1.333 | 8 |
| B | 50=8*6.25 | 33.33=8*6.25*0.666 | 8 |
| C | 0 | 0 | 0 |

| DB2 System | Processors | Single Processor Speed (MIPS) | Total (MIPS) |
|---|---|---|---|
|  |  |  |  |
| A | 8 | 200 | 1600 |
| B | 8 | 100 | 800 |
| C | 4 | 100 | 400 |
|  | 20 |  | 2800 |

| DB2 System | Scaling factor |
|---|---|
|  |  |
| A | 1.428=200 MIPS/140 MIPS |
| B | 0.714=100 MIPS/140 MIPS |
| C | 0.714=100 MIPS/140 MIPS |

| DB2 System | Amount of Work Average Processors in DB2 System | Amount of Work Actual Processors in DB2 System | Desired Tasks |
|---|---|---|---|
|  |  |  |  |
| A | 40=8*5 | 57.13=8*5*1.428 | 40 |
| B | 40=8*5 | 28.57=8*5*0.714 | 40 |
| C | 20=4*5 | 14.29=4*5*0.714 | 20 |

APPORTIONING A WORK UNIT TO EXECUTE IN PARALLEL IN A HETEROGENEOUS ENVIRONMENT

PROVISIONAL APPLICATION

This application claims the benefit of U.S. Provisional Application No. 60/064,753, entitled "METHOD FOR APPORTIONING A WORK UNIT TO EXECUTE IN PARALLEL IN A HETEROGENEOUS ENVIRONMENT," filed on Nov. 7, 1997, by Ted E. Blank, et al., which is incorporated by reference herein.

BACKGROUND OF THE INVENTION

1. Field of the Invention

This invention relates in general to computer-implemented processing systems, and, in particular, to a technique for apportioning a work unit to execute in parallel in a heterogeneous environment.

2. Description of Related Art

A relatively recent innovation in computer systems has been to distribute processing of units of work (e.g., a unit of work may be a computer task that selects data from a database) to multiple computer systems connected by a network. Each distributed computer system has one or more processors for executing units of work. A distributed computer system has many advantages over a centralized scheme with regard to flexibility and cost effectiveness.

When a computer system consists of multiple processors (i.e., central processors or "CPs"), each processor may have a different processing power. A processor is part of a computer system that executes instructions to complete a unit of work. Processor power indicates how quickly a processor is able to execute a unit of work. Typically, the processing power is represented with reference to how many millions of instructions per second (MIPS) that a processor executes.

A multitude of configurations are possible for a multi-processor computer system. For example, a user might wish to run a query (i.e., which is an example of a unit of work) in a computer system that consists of a 2-way system (i.e., a computer system that includes 2 processors) and an 8-way system (i.e., a computer system that includes 8 processors).

In a distributed environment, work generated at one computer system on the network may be divided and distributed to other computer systems on the network for processing. In many situations, the workload is not distributed efficiently. For example, a slower processor may be given the same amount of work as a faster processor. If this were to happen, the faster processor would complete its processing and wait for the slower processor to complete its processing. It is a waste of resources to let the faster processor wait idly. Thus, to efficiently utilize the processors, it is desirable to make optimal assignments of work to each available processor.

Some conventional computer systems that distribute work across processors require a homogeneous configuration. In a homogeneous configuration, each processor has the same processing power. In a homogeneous configuration, work is simply apportioned evenly across each processor (i.e., each processor is given the same amount of work). However, the homogeneous configuration is not always the way users grow their computer systems.

One implication of the ability of networked computer systems to grow or shrink with time is that processors within each computer system may be entirely different. Some processors may be purchased at later times and have advantages due to improved technology, and some processors may have more processing power than others. Additionally, the networked computer systems may originally contain processors optimized for different purposes, from desktop computers to massively parallel processors (MPP's).

In a heterogeneous environment, each processor may have a different processing power. Therefore, apportioning work in a heterogeneous environment is challenging. Some conventional computer systems divide a work unit into even portions and distribute the same amount of work to each processor, regardless of the processing power of each processor. In this case, it is likely that slower processors will create a bottleneck that can affect the total elapsed time of processing the work unit. Additionally, dividing a work unit up evenly may prevent the full use of a faster processor's capabilities since the slowest processor in the configuration will always be the last to finish.

One aspect of the flexibility of networked computer systems is that their configuration can be changed easily. For example, a processor in a computer system assigned to the accounting department might be available to every computer system belonging to the network of computer systems most of the time; but, when the accounting department has a peak load, that processor may be made unavailable to the network of computer systems for a day to dedicate it to the work of the accounting department. Additionally, due to fluctuations in the workload, or due to imperfections in the work allocation technique, some processors may develop a backlog of work that has been assigned to them, while other processors are idle.

There is a need for improved allocation technique to provide efficient allocation of work to processors.

SUMMARY OF THE INVENTION

To overcome the limitations in the prior art described above, and to overcome other limitations that will become apparent upon reading and understanding the present specification, the present invention discloses a method, apparatus, and article of manufacture for a computer-implemented apportioning system.

In accordance with the present invention, work is distributed to processors in a multi-processor computer system. Initially, during bind-time, a scaling factor is determined for each processor. The scaling factor represents relative processing power in relation to each other processor. Then, portions of a total amount of work are distributed to each processor based on the determined scaling factor of that processor and a determined amount of work for an average processor.

An object of the invention is to provide an improved technique for distributing work across processors in one computer system. Another object of the invention is to provide a technique for distributing work across computer systems having one or more processors and connected by a network. Yet another object of the invention is to provide a technique for distributing work across processors so that each of the processors completes processing at approximately the same time.

BRIEF DESCRIPTION OF THE DRAWINGS

Referring now to the drawings in which like reference numbers represent corresponding parts throughout:

FIGS. 5A–5C illustrate an example of the apportioning system performing a CPU bound query during a bind-time phase;

FIGS. 6A–6C illustrate an example of the apportioning system performing a CPU bound query during a run-time phase in which an additional processor has been added since the bind-time phase;

FIGS. 7A–7C illustrate an example of the apportioning system performing a CPU bound query during a run-time phase with a limit on the buffer space; and FIGS. 8A–8C illustrate an example of the apportioning system performing an I/O bound query during a bind-time phase.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
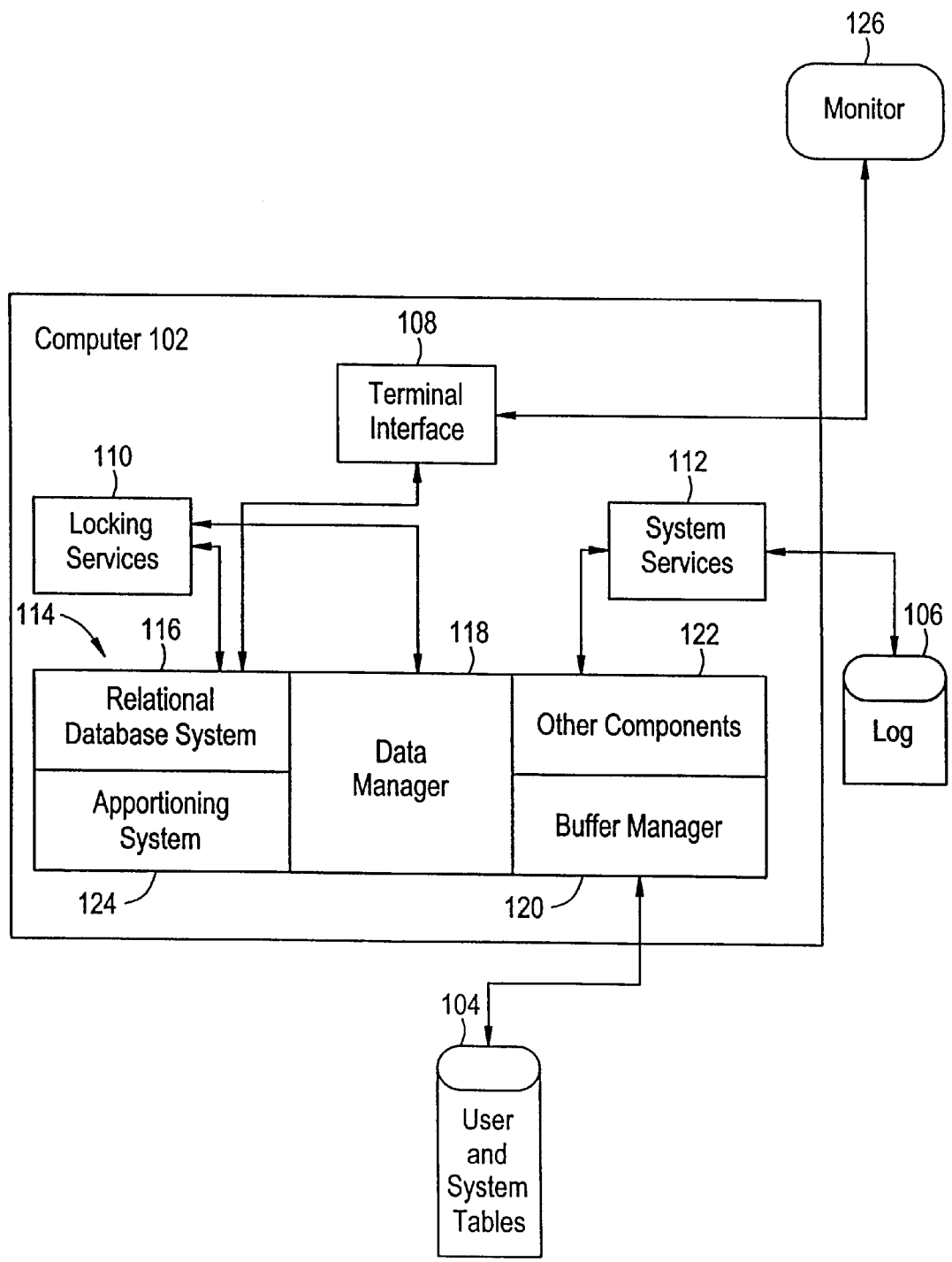
FIG. 1 illustrates an exemplary computer hardware environment that could be used in accordance with the present invention.

FIG. 1 illustrates an exemplary computer hardware environment that could be used in accordance with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

In the preferred embodiment of the present invention, the present invention comprises the DB2® product offered by IBM for the OS/390® operating system. Those skilled in the art will recognize, however, that the present invention has application program to any software and is not limited to the DB2® product.

As illustrated in FIG. 1, the DB2® system for the OS/390® operating system includes three major components: the Internal Resource Lock Manager (IRLM) 110, the Systems Services module 112, and the Database Services module 114. The IRLM 110 handles locking services for the DB2® system, which treats data as a shared resource, thereby allowing any number of users to access the same data simultaneously. Thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® system is the Database Services module 114. The Database Services module 114 contains several submodules, including the Relational Database System (RDS) 116, the Data Manager 118, the Buffer Manager 120 (which manages the buffer space (i.e., memory reserved for use by a processor to execute a unit of work)), the Apportioning System 124, and other components 122 such as an SQL compiler/interpreter. These submodules support the functions of the SQL language, i.e. definition, access control, interpretation, compilation, database retrieval, and update of user and system data. The Apportioning System 124 works in conjunction with the other submodules to apportion work across multiple processors.

SQL statements are interpreted and executed in the DB2 system. The SQL statements are input to a pre-compiler. There are two outputs from the pre-compiler: a modified source module and a Database Request Module (DBRM). The modified source module contains host language calls to DB2, which the pre-compiler inserts in place of SQL statements. The DBRM consists of the SQL statements. A compile and link-edit component uses the modified source module to produce a load module, while an optimize and bind component uses the DBRM to produce a compiled set of runtime structures for the application plan. The SQL statements specify only the data that the user wants, but not how to get to it. The optimize and bind component may reorder the SQL query. Thereafter, the optimize and bind component considers both the available access paths (indexes, sequential reads, etc.) and system held statistics on the data to be accessed (the size of the table, the number of distinct values in a particular column, etc.), to choose what it considers to be the most efficient access path for the query. The load module and application plan are then executed together.

Generally, the Apportioning System 124 and the instructions derived therefrom, are all tangibly embodied in a computer-readable medium, e.g. one or more of the data storage devices 104 and 106. Moreover, the Apportioning System 124 and the instructions derived therefrom, are all comprised of instructions which, when read and executed by the computer system 102, causes the computer system 102 to perform the steps necessary to implement and/or use the present invention. Under control of an operating system, the Apportioning System 124 and the instructions derived therefrom, may be loaded from the data storage devices 104 and 106 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Figure 2:
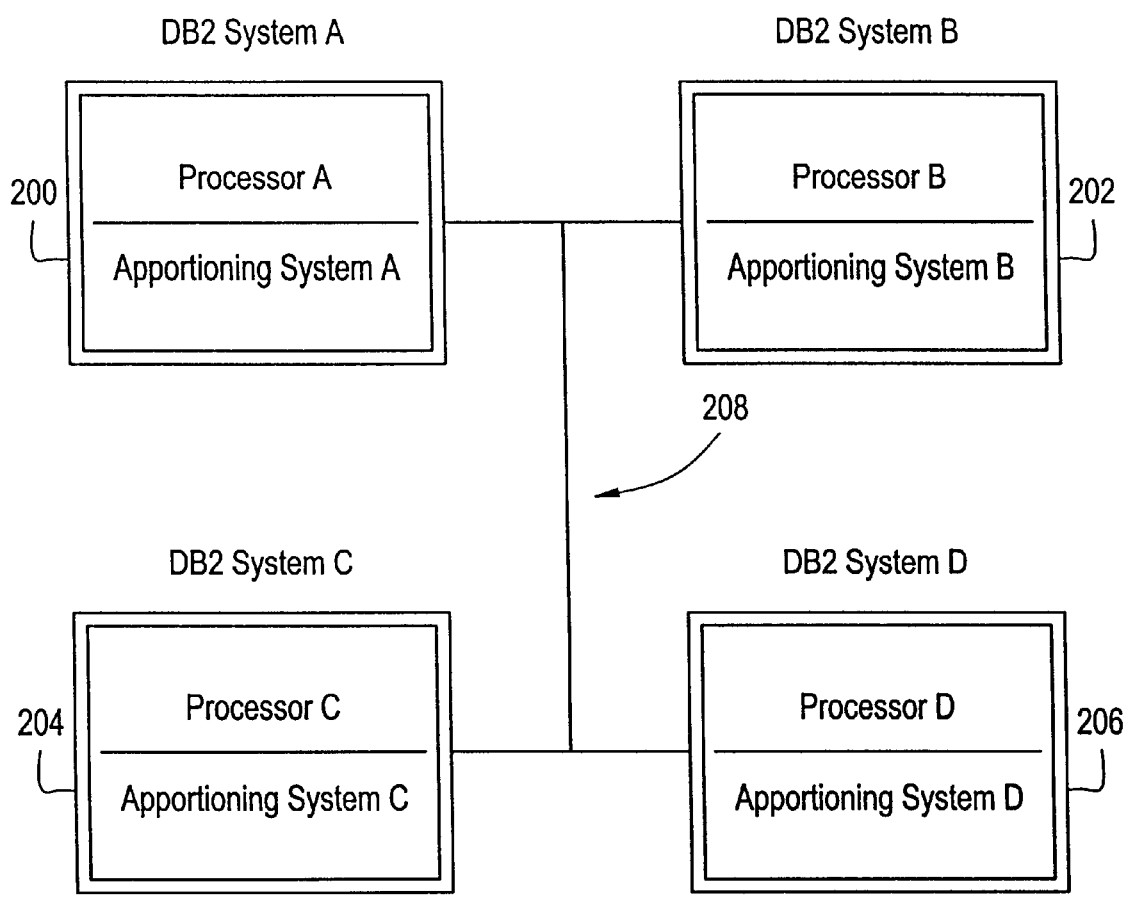
FIG. 2 illustrates an exemplary network environment connecting multiple computer systems used to implement the preferred embodiment of the invention.

FIG. 2 illustrates an exemplary network environment connecting multiple computer systems used to implement the preferred embodiment of the invention. Multiple, separate DB2 systems, 200, 202, 204, and 206, each having a processor and an apportioning system, are connected by a network 208. Each of the DB2 systems is illustrated with one processor; however, each of the computer systems could have multiple processors. Additionally, each of the computer systems could include other components, such as connected data storage devices. The apportioning system 124 is able to apportion work to processors that are in separate computer systems connected by a network, as will be described in further detail below.

Apportioning a Work Unit to Execute in Parallel in a Heterogeneous Environment

The apportioning system 124 of the present invention apportions a work unit across multiple processors to give faster processors more work than slower processors so that all the processors complete in approximately the same amount of time. The apportioning system 124 achieves this by taking into account system configuration factors hat have a substantial impact on the optimization of an allocation.

In particular, the apportioning system 124 determines a scaling factor for each processor based on the average speed of all the processors. The scaling factor represents relative processing power in relation to each other processor. A faster than average processor will have a scaling factor greater than one, while a slower than average processor will have a scaling factor less than one.

Then, the apportioning system 124 divides the work unit into partitions based on the average processor speed to obtain the amount of work performed by an average processor (i.e., average amount of work per processor). This amount of work per average processor is multiplied by the processor's scaling factor to determine the actual amount of work for each processor. In this way, a faster than average processor gets more work than a slower than average processor.

In a bind-time phase, the apportioning system 124 makes an initial determination of how much work to apportion to each processor for each system. In a DB2® system, "bind-time" refers to the time during which the optimize and bind performs determines the most efficient access path for the query, while "run-time" refers to the time during which the SQL statements submitted to the DB2® system are executed.

The resources (e.g., the number of processors or buffer space available during bind-time) may change by run-time. In a run-time phase, the apportioning system 124 determines whether the number of available processors has changed from the bind-time phase and whether there are adequate other resources (e.g., available memory, in addition to buffer space, to accommodate the desired number of parallel tasks) to process the work. If any of these conditions exist, the apportioning system 124 re-evaluates the amount of work to apportion to each processor in each system to determine an optimum workload balance for the current run-time environment.

The following example is provided to illustrate the use of the apportioning system 124 in embodiment of the invention. Initially, the apportioning system 124 receives a query (e.g., from a user or an application). The query is a request for data from a database.

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. The tables are typically stored on direct access storage devices (DASD), such as magnetic or optical disk drives for semi-permanent storage.

A table can be divided into partitions, with each partition containing a portion of the table's data. By partitioning tables, the speed and efficiency of data access can be improved. For example, partitions containing more frequently used data can be placed on faster data storage devices, and parallel processing of data can be improved by spreading partitions over different DASD volumes, with each I/O stream on a separate I/O path. Partitioning also promotes high data availability, enabling application and utility activities to progress in parallel on different partitions of data.

Data may be distributed among partitions by a variety of schemes ("partitioning schemes"). One partitioning scheme assigns data to partitions according to a boundary value present in specified columns of the data row. The boundary value is the data value that separates each partition from the next partition. In one database system, the DB2® product offered by International Business Machines Corporation, Armonk, N.Y., a range of values is associated with each table partition by means of a CREATE INDEX statement. The CREATE INDEX statement gives the boundary value for each partition.

To perform the query, the apportioning system 124 identifies the partitions of tables referenced by the query that may be executed in parallel on multiple processors. The apportioning system 124 determines how many of these partitions should be apportioned to each available processor to provide efficient use of each processor. When the apportioning system 124 is used in conjunction with work that is not already partitioned (e.g., partitions of a table), the apportioning system 124 partitions the work.

During a bind-time phase, the apportioning system 124 determines the number of partitions to be apportioned to each available processor based on the configuration of the system at bind-time. The apportioning system 124 looks at various elements of configuration, including the number of processors available and the amount of memory available for the processors to execute tasks.

The apportioning system 124 determines a processor power value that represents the capability of each of the processors that may be apportioned work. Different measures may be used to determine the processing power value. For example, a rating for the number of millions of instructions per second (MIPS) the processor is capable of executing may be used as a processor power value.

The apportioning system 124 determines the total capability ("total processing power") of a system by adding the processor power values of the processors in the system. When processing power is represented by MIPS, the apportioning system 124 sums the MIPS of each processor.

The apportioning system 124 determines the average capability ("average processing power") of the processors in the system by dividing the total capability by the number of processors selected.

The apportioning system 124 then determines the number of partitions that would be allocated to an average processor. This number would be the optimal number to assign to each processor if the computing system were a homogeneous symmetrical multiprocessor (SMP) system.

In the preferred embodiment, the number of partitions to apportion to each processor is adjusted based on the capability of each processor. In particular, the apportioning system 124 scales the number of partitions to be allocated to an average processor by the ratio of the capability associated with that processor to the average capability of the selected processors.

During a run-time phase, the apportioning system 124 re-evaluates the apportionment of partitions to each processor based on the configuration of the computer system at run-time. For example, if after the bind-time phase, the apportioning system 124 determines that the number of processors or the amount of available memory has changed, the apportioning system 124 re-determines the apportionment of partitions to processors. The apportioning system 124 then apportions partitions to each processor according to the number of partitions it has determined for that processor.

In an alternative embodiment, the apportioning system 124 may determine a number of partitions to be apportioned to a cluster of processors. If the processors within the cluster have identical capability, the apportioning system 124 multiplies the number of processors in the cluster by the capability of any of the processors within the cluster to identify an average capability and uses the average capability in determining apportionment, otherwise, the apportioning system 124 sums the scale factors for each processor within the cluster and uses the summed scale factor to apportion work.

In another alternative embodiment, the apportioning system can determine that one or more processors are orders of magnitude faster than one or more other processors. Then, the apportioning system 124 could send all of the work to be performed to the faster processors, without sending work to the slower processors.

Bind-Time Phase

The following elements are performed by the apportioning system 124 in one embodiment of the invention.

1. First, the apportioning system 124 determines the average MIPS, represented by "avgMIPS". The average MIPS is the average capability for all processors and is equal to the sum of each processor's MIPS, which is represented by "sum (procMIPS)", divided by the number of processors, which is represented by "proc#".

avgMIPS=sum(procMIPS)/proc#

2. Then, the apportioning system 124 determines the scaling factor, which is represented by "procScaleFactor", for each processor equal to the processor's MIPS, which is represented by "procMIPS", divided by the average MIPS for all processors, which is represented by "avgMIPS".

procScaleFactor=procMIPS/avgMIPS

3. Next, the apportioning system 124 determines the amount of work for an average processor, which is represented as "avgWork" based on the homogenous SMP environment of average processors. The work for an average processor is the equal to the number of processors, "proc#", of a computer system times a value, which is represented by "boundVal", that is based on whether work is CPU bound or I/O bound. In particular, the boundVal parameter equals the number of partitions divided by the degree of parallelism. If the work is CPU bound, the degree of parallelism will approach the number of CPU processes available. If the work is I/O bound, the degree of parallelism will approach the number of tasks desired.

avgWork=proc#*boundVal

4. The apportioning system 124 determines the amount of work for each actual processor, which is represented by "procWork", equal to the processor's scale factor, which is represented by "procScaleFactor", times the amount of work for the average processor, which is represented by "avgWork".

procWork=procScaleFactor*avgWork

Figure 3:
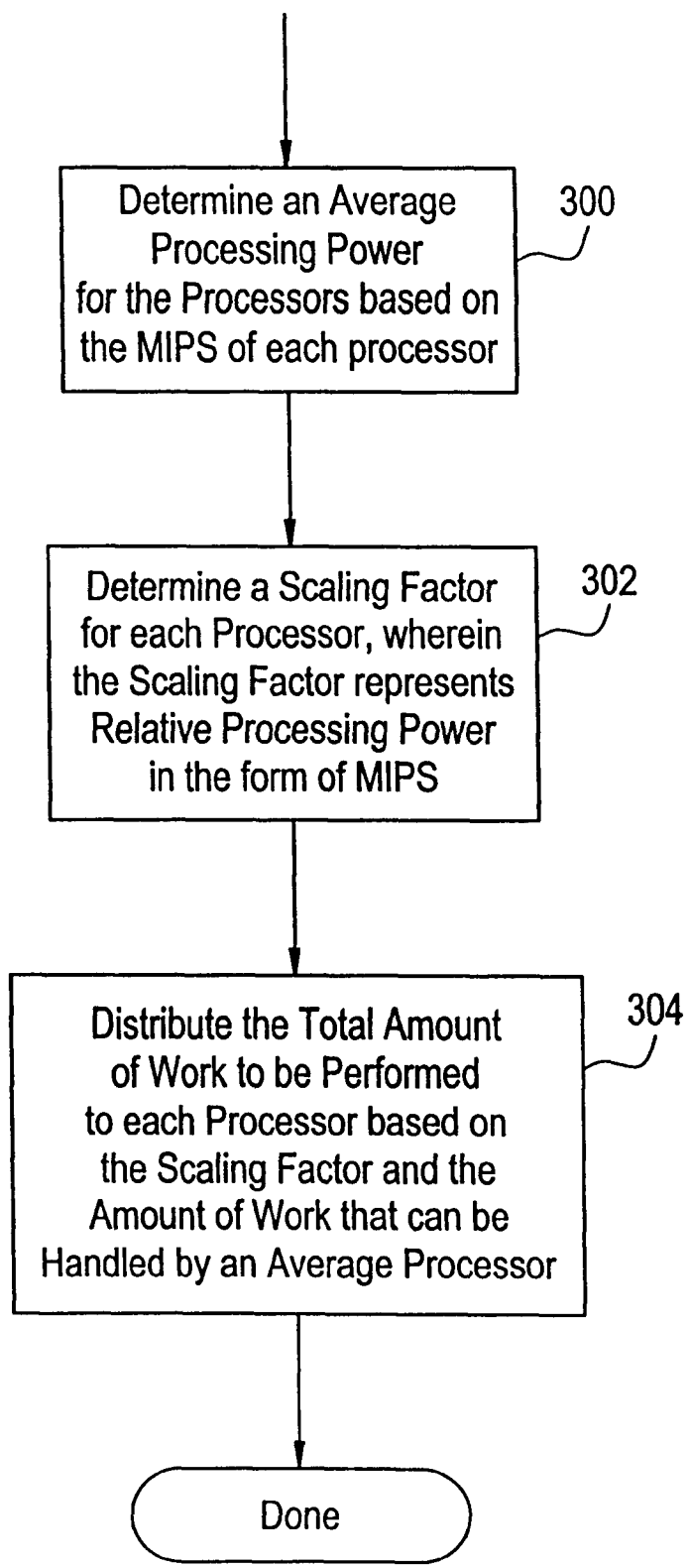
FIG. 3 is a flow diagram illustrating the steps performed by the apportioning system during a bind-time phase.
Figure 4:
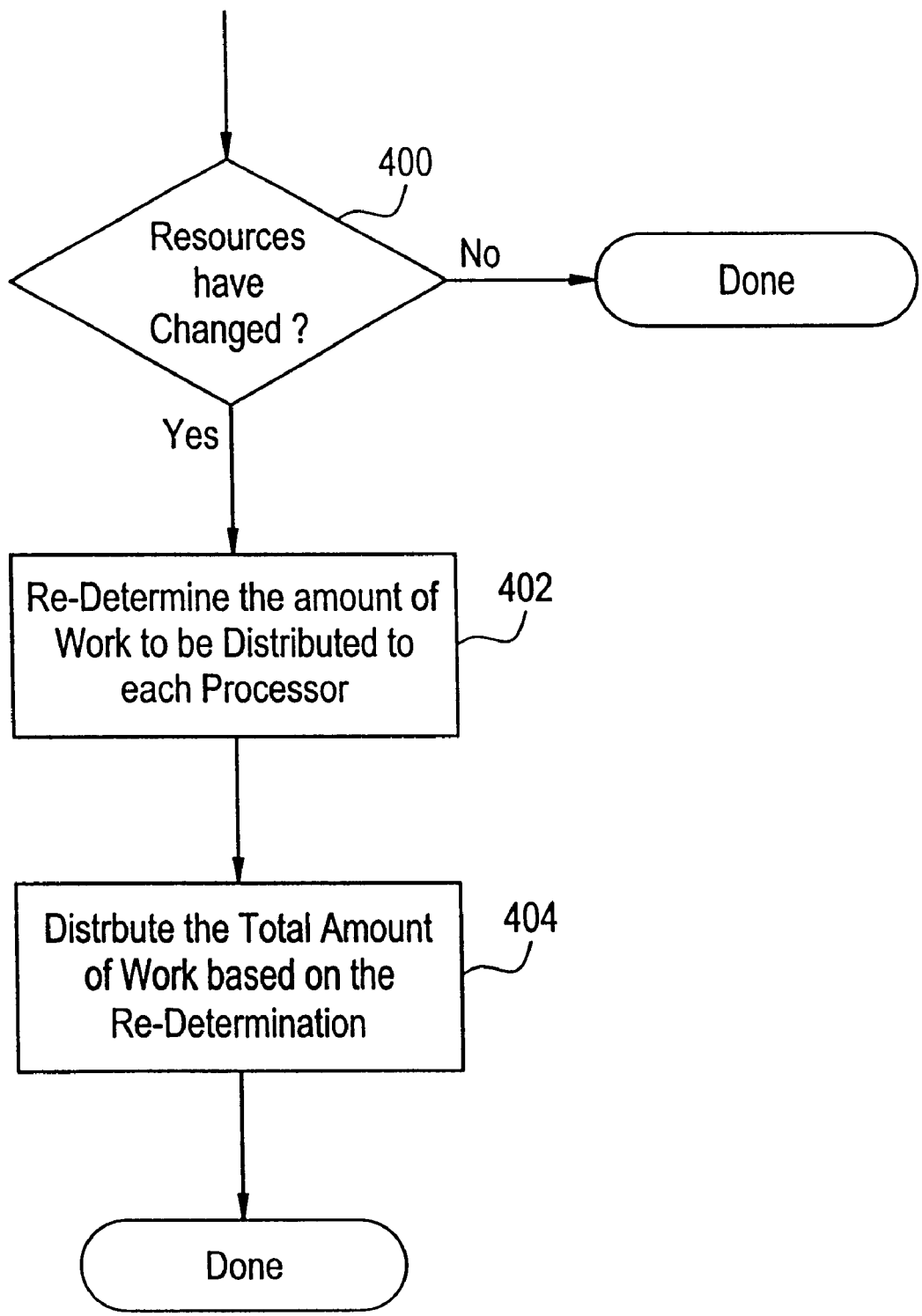
FIG. 4 is a flow diagram illustrating the steps performed by the apportioning system during a run-time phase.

FIG. 3 is a flow diagram illustrating the steps performed by the apportioning system 124 during a bind-time phase. In Block 300, the apportioning system 124 determines an average processing power for the processors based on the MIPS of each processor. In Block 302, the apportioning system 124 determines a scaling factor for each processor, wherein the scaling factor represents relative processing power in the form of MIPS. In Block 304, the apportioning system 124 distributes the total amount of work to be performed to each processor based on the scaling factor and the amount of work that can be handled by an average processor.

Run-Time Phase

If the resources change from bind-time to run-time, the apportioning system 124 re-determines the distribution of work to processors. The change in resources could be any type of change, including an increase, decrease, or addition, and could be any type of resource, such as storage space. For example, the resource change could be an increase in the number of available processors or could be a limit on the buffer space needed by the processors to accommodate parallel tasks. Therefore, the apportioning system re-executes the bind-time phase with the changed resources (e.g., more available processors or a new limit on the maximum number of tasks which can be accommodated due to the limit on buffer space). For example, for each query received, the apportioning system 124, at the beginning of execution, determines whether resources have changed. In particular, the apportioning system 124 checks the configuration of a computer system to determine whether there has been a change in the number of processors since bind-time. Additionally, the apportioning system 124 checks for the size of the buffer space to determine whether the buffer space can accommodate the number of tasks to be executed in parallel.

FIGS. 5A–5C, 6A–6C, 7A–7C and 8A–8C below illustrate examples of the use of the apportioning system 124.

EXAMPLES

FIGS. 5A–5C illustrate an example of the apportioning system 124 performing a CPU bound query during a bind-time phase. In this example, a database table that is referenced in a query is divided into 100 partitions (e.g., datasets or files). To perform the query, the apportioning system 124 will submit instructions to different processors to perform the query on different partitions of the database table.

Information table 500 provides the names of the DB2 systems 502 that could execute work, the number of processors 504 of each DB2 system 502, the MIPS 506 executed by each processor 504 of each DB2 system 502, and the total MIPS 508 for each DB2 system 502. For example, DB2 System A has eight processors, each executing 200 MIPS, with a total processing power of 1600 MIPS.

Using the total number of processors 510 (i.e., 20) for all of the computer systems and the total MIPS 512 (i.e., 2800)

for all of the DB2 systems, the apportioning system 124 determines that the average MIPS is as follows:

avgMIPS=2800/20=140 MIPS

Next, the apportioning system 124 determines scaling factors for each DB2 system. Information Table 520 identifies the DB2 systems 522 and their scaling factors 524. For example, DB2 System A has a scaling factor of 1.428 (i.e., 200 MIPS/140 MIPS)), which reflects the higher processing power of DB2 System A relative to DB2 System B with a scaling factor of 0.714 and DB2 System C with a scaling factor of 0.714.

Information Table 530 identifies the DB2 systems 532, along with the determination of the amount of work for an average processor 534. In a homogenous SMP environment in which the work is CPU bound, the apportioning system 124 determines the amount of work for an average processor based on the number of processors and a bound value that reflects that the work is CPU bound. The apportioning system 124 determines the bound value by dividing the number of partitions (i.e., 100) by the number of processors (i.e., 20). Thus, the apportioning system 124 determines that there are to be 5 partitions/processor, which is the bound value. The amount of work for an average processor in a DB2 system 534 is equivalent to the number of processors of the computer system times the bound value. For example, DB2 System A has 8 processors and the bound value is 5, so 40 is an indicator of the amount of work of an average processor in DB2 System A.

Once the amount of work for an average processor is determined, the apportioning system 124 determines the amount of work to be actually distributed to each DB2 system 536. The amount to be distributed to each DB2 system is the scaling factor for that computer system times the amount of work for an average processor. For example, for DB2 System A, the amount of work to be distributed to processors in DB2 System A is equal to the scaling factor of 1.428 times the amount of work an average processor in the computer system could perform, which is 40. Additionally, each processor in the DB2 system gets an amount of work equal to the amount of work distributed to the DB2 system divided by the number of processors for that DB2 system. For example, for DB2 System A, each processor gets 7.14 of the work (i.e., 57.13/8). The desired tasks 538 are the number of tasks to be distributed to each DB2 system. The number of desired tasks for a DB2 system is equal to (the degree of parallelism) times (the number of processors on the DB2 system divided by the total number of processors). For example in FIGS. 5A–5C, for DB2 system A, the number of desired tasks (8) is equal to (20) time (8/20).

Information Table 530 of the example shows that the DB2 system with the faster processors get more work than the DB2 systems with slower processors. This allows the work to be divided up so that each processor will finsh in the same amount of time and prevents the slower processors from becoming a bottleneck.

FIGS. 6A–6C illustrate an example of the apportioning 124 performing a CPU bound query during a run-time phase in which an additional processor has been added since the bind-time phase. Suppose another DB2 System, such as DB2 System D, is brought up after bind-time. This would mean more processors could be used to apportion work, and so the apportioning 124 re-determines the scaling factors for all of the DB2 systems. Since the total number of processors is 25, instead of 20, this would lead to each processor working on 4 partitions in a homogeneous SMP environment in which work is CPU bound (i.e., 100 partitions/25 processors=4 partitions/processor).

Information Table 600 provides the names of the four DB2 systems 602 that could execute work, the number of processors 604 of each DB2 system 602, the MIPS 606 executed by each processor 604 of each DB2 system 602, and the total MIPS 608 for each DB2 system 602.

Using the total number of processors 610 for all of the systems and the total MIPS 612 for all of the DB2 systems, the apportioning system 124 determines that the average MIPS is as follows:

AvgMIPS=3050/25=122 MIPS

Next, the apportioning system 124 determines scaling factors for each DB2 system. Information Table 620 identifies the DB2 systems 622 and their scaling factors 624.

Information Table 630 identifies the DB2 systems 632, along with the determination of the amount of work for an average processor 634. In a homogenous SMP environment in which the work is CPU bound, the apportioning system 124 determines the amount of work for an average processor based on the number of processors and a bound value that reflects that the work is CPU bound. The apportioning system 124 determines the bound value by dividing the number of partitions (i.e., 100) by the number of processors. Thus, the apportioning system 124 determines that there are to be 4 partitions/processor, which is the bound value. The amount of work for an average processor 636 is the number of processors of the computer system times the bound value.

Once the amount of work for an average processor is determined, the apportioning system 124 determines the amount of work to be distributed to each DB2 system 636. The amount to be distributed to each DB2 system is the scaling factor for that computer system times the amount of work for an average processor. Additionally, each processor in the DB2 system gets an amount of work equal to the amount of work distributed to the DB2 system divided by the number of processors for that DB2 system. The desired tasks are 638 the number of tasks to be distributed to each DB2 system.

Information Table 630 of the example shows that even when a DB2 System with slower processors is added between bind-time and run-time, the amount of work is redistributed appropriately based on a relative processor speed of all available processors.

FIGS. 7A–7C illustrate illustrates an example of the apportioning system 124 performing a CPU bound query during a run-time phase with a limit on the buffer space. Suppose there is no more buffer space on DB2 System C. When buffer space is not available, work cannot be processed on that computer system, so there is no reason to use that computer system's processors for apportioning work. Therefore, none of the processors of System C are used, and the scaling factors for the remaining DB2 systems must be re-determined. Since the number of allowed tasks is 16 in this CPU bound environment, this would lead to each task working on 6.25 partitions (i.e., (100 partitions/16 tasks= 6.25 partitions/task)) in a homogenous SMP environment.

Information Table 700 provides the names of the DB2 systems 702 that could execute work, the number of processors 704 of each DB2 system 702, the MIPS 706 executed by each processor 704 of each DB2 system 702, and the total MIPS 708 for each DB2 system 702.

Using the total number of processors 710 for all of the computer systems and the total MIPS 712 for all of the DB2 systems, the apportioning system 124 determines that the average MIPS is as follows:

AvgMIPS=2400/16=150 MIPS

Next, the apportioning system 124 determines scaling factors for each DB2 system. Information Table 720 identifies the DB2 systems 722 and their scaling factors 724.

Information Table 730 identifies the DB2 systems 732, along with the determination of the amount of work for an average processor 734. In a homogenous SMP environment in which the work is CPU bound, the apportioning system 124 determines the amount of work for an average processor based on the number of processors and a bound value that reflects that the work is CPU bound. The apportioning system 124 determines the bound value by dividing the number of partitions (i.e., 100) by the number of processors. Thus, the apportioning system 124 determines that there are to be 6.25 partitions/processor, which is the bound value. The amount of work for an average processor is the number of processors of a computer system times the bound value.

Once the amount of work for an average processor is determined, the apportioning system 124 determines the amount of work to be distributed to each DB2 system 736. The amount to be distributed to each DB2 system is the scaling factor for that computer system times the number of processors in the computer system. Additionally, each processor in the DB2 system gets an amount of work equal to the amount of work distributed to the DB2 system divided by the number of processors for that DB2 system. The desired tasks are 738 the number of tasks to be distributed to each DB2 system.

Information Table 730 of the example shows that even when a DB2 System has buffer space shortage at run-time, the number of tasks is reduced.

Information Table 700 of the example shows that when the allowed number of tasks falls below a DB2 system's processor numbers the scaling factors must be redetermined. It also shows that the amount of work for the average processor is divided equally between both DB2 systems since they have the same number of processors. However, when the scaling factors for each DB2 system are used, the amount of work for the actual processors causes the DB2 system with the faster processors to get more work.

FIGS. 8A–8C illustrate an example of the apportioning system performing an I/O bound query during a bind-time phase. In this example, the database table that is referenced in a query is divided into 100 partitions (e.g., datasets or files). To perform the query, the apportioning system 124 will submit instructions to different processors to perform the query on different partitions of the database table Information table 800 provides the names of the DB2 systems 802 that could execute work, the number of processors 804 of each DB2 system 802, the MIPS 806 executed by each processor 804 of each DB2 system 802, and the total MIPS 808 for each DB2 system 802. For example, DB2 System A has eight processors, each executing 200 MIPS, with a total processing power of 1600 MIPS.

Using the total number of processors 810 (i.e., 20) for all of the systems and the total MIPS 812 (i.e., 2800) for all of the DB2 systems, the apportioning system 124 determines that the average MIPS is as follows:

avgMIPS=2800/20=140 MIPS

Next, the apportioning system 124 determines scaling factors for each DB2 system. Information Table 820 identifies the DB2 systems 822 and their scaling factors 824. For example, DB2 System A has a scaling factor of 1.428 (i.e., 200 MIPS/140 MIPS)), which reflects the higher processing power of DB2 System A relative to DB2 System B with a scaling factor of 0.714 and DB2 System C with a scaling factor of 0.714.

Information Table 830 identifies the DB2 systems 832, along with the determination of the amount of work for an average processor 834. The apportioning system 124 determines the number of tasks for an average processor when work is I/O bound differently than when work is CPU bound. However, the bound value is still based on the number of processors regardless of whether the work is CPU bound or I/O bound.

In particular, in a homogenous SMP environment in which the workload is I/O bound, the apportioning system 124 determines the amount of work for an average processor based on the number of processors and a bound value that reflects that the system is I/O bound. The apportioning system 124 determines the bound value by dividing the number of partitions (i.e., 100) by the number of processors. Assuming that there are to be 5 tasks per processor, since there are 20 processors, the number of tasks used for the determination is 100. Thus, the apportioning system 124 determines that there is to be 1 partition/task and the bound value is 5 partitions/processor. The average amount of work for processors in a DB2 system 834 is the number of processors of a system times the bound value. For example, DB2 System A has 8 processors and the bound value is 5, so 40 is an indicator of the amount of work of average processors in the DB2 System A.

Once the amount of work for an average processor is determined, the apportioning system 124 determines the amount of work to be distributed to each DB2 system 836. The amount to be distributed to each DB2 system is the scaling factor for that system times the amount of work for an average processor. For example, for DB2 System A, the amount of work to be distributed to processors in DB2 System A is equal to the scaling factor of 1.428 times the amount of work average processors in the system could perform, which is 40. Additionally, each processor in the DB2 system gets an amount of work equal to the amount of work distributed to the DB2 system divided by the number of processors for that DB2 system. For example, for DB2 System A, each processor gets 7.14 of the work (i.e., 57.13/8). The desired tasks 838 are the number of tasks to be distributed to each DB2 system. The number of desired tasks for a DB2 system is equal to (the degree of parallelism) times (the number of processors on the DB2 system divided by the total number of processors).

Information Table 830 of the example shows that the DB2 system with the faster processors gets more work than the DB2 systems with slower processors. This allows the work to be divided up so that each processor will finish in the same amount of time and prevents the slower processors from becoming a bottleneck.

Conclusion

This concludes the description of the preferred embodiment of the invention. The following describes some alternative embodiments for accomplishing the present invention. For example, any type of computer system, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a computer-implemented apportioning system. The present invention provides an improved technique for distributing work across processors. Additionally, the present invention provides a technique for distributing work across computer systems having one or more processors and connected by a network. Moreover, the present invention provides a technique for distributing work across processors so that each of the processors completes processing at approximately the same time.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of distributing work to processors in a multi-processor system, the method comprising:

during bind-time,
  determining an average processing power for each processor, said average processing power being the sum of the processing powers of the processors divided by the number of processors;
  thereafter determining a scaling factor for each processor, wherein the scaling factor represents processing power of a processor divided by the average processing power; and
  distributing portions of a total amount of work to each processor based on the determined scaling factor of that processor and a determined amount of work for an average processor.

2. The method of claim 1, wherein distributing portions of a total amount of work to each processor based on the determined scaling factor of that processor further comprises:
  determining an amount of work that can be handled by an average processor; and
  distributing portions of a total amount of work to each processor based on the determined scaling factor of that processor and a determined amount of work for an average processor.

3. The method of claim 2, wherein determining an amount of work that can be handled by an average processor further comprises:
  determining whether the work is I/O bound or CPU bound; and
  determining the amount of work for an average processor based on a selected number of processors and a value based on the determination as to how the work is bound.

4. The method of claim 1, further comprising, during run-time, re-determining the portions of work to be distributed to each processor based on a change in resources.

5. The method of claim 4, wherein the change in resources is a change in the number of processors.

6. The method of claim 4, wherein the change in resources is a change in an amount of storage to be used by the processors.

7. The method of claim 1, wherein the multiple processors are on different systems connected by a network.

8. The method of claim 1, wherein the multiple processors are part of one system.

9. An apparatus for distributing work to processors in a multi-processor system, comprising:
  a computer having a data storage device connected thereto, wherein the data storage device stores a database containing the partitioned data;
  one or more computer programs, performed by the computer, for, during binding:
    determining an average processing power for each processor, said average processing power being the sum of the processing powers of the processors divided by the number of processors;
    thereafter determining a scaling factor for each processor, wherein the scaling factor represents processing power of a processor divided by the average processing power; and
    distributing portions of a total amount of work to each processor based on the determined scaling factor of that processor and a determined amount of work for an average processor.

10. The apparatus of claim 9, wherein the scaling factor is determined by the processing power of a processor divided by the average processing power.

11. The apparatus of claim 9, wherein the means for distributing portions of a total amount of work to each processor based on the determined scaling factor of that processor further comprises:
  means for determining an amount of work that can be handled by an average processor; and
  means for distributing portions of a total amount of work to each processor based on the determined scaling factor of that processor and a determined amount of work for an average processor.

12. The apparatus of claim 11, wherein the means for determining an amount of work that can be handled by an average processor further comprises:
  means for determining whether the work is I/O bound or CPU bound; and
  means for determining the amount of work for an average processor based on a selected number of processors and a value based on the determination as to how the work is bound.

13. The apparatus of claim 9, further comprising, during run-time, means for re-determining the portions of work to be distributed to each processor based on a change in resources.

14. The apparatus of claim 13, wherein the change in resources is a change in the number of processors.

15. The apparatus of claim 13, wherein the change in resources is a change in an amount of storage to be used by the processors.

16. The apparatus of claim 9, wherein the multiple processors are on different systems connected by a network.

17. The apparatus of claim 9, wherein the multiple processors are part of one system.

18. The apparatus of claim 9, wherein the one or more computer programs performed by the computer that distribute portions of a total amount of work to each processor based on the determined scaling factor of that processor further comprise:
  one or more computer programs that determine an amount of work that can be handled by an average processor; and
  one or more computer programs that distribute portions of a total amount of work to each processor based on the determined scaling factor of that processor and a determined amount of work for an average processor.

19. The apparatus of claim 18, wherein the one or more computer programs performed by the computer that determine an amount of work that can be handled by an average processor further comprise:
  one or more computer programs performed by the computer that determine whether the work is I/O bound or CPU bound; and one or more computer programs performed by the computer that determine the amount of work for an average processor based on a selected number of processors and a value based on the determination as to how the work is bound.

20. The apparatus of claim 9, further comprising one or more computer programs performed by the computer during run-time that re-determine the portions of work to be distributed to each processor based on a change in resources.

21. An article of manufacture comprising a program carrier readable by a computer and embodying one or more instructions executable by a computer to perform a method that distributes work to processors in a multi-processor system, in a database stored data storage device connected to the computer, the method comprising:
   during bind-time:
      determining an average processing power for each processor, said average processing power being the sum of the processing powers of the processors divided by the number of processors;
      thereafter determining a scaling factor for each processor, wherein the scaling factor represents processing power of a processor divided by the average processing power; and
      distributing portions of a total amount of work to each processor based on the determined scaling factor of that processor and a determined amount of work for an average processor.

22. The article of manufacture of claim 21, wherein distributing portions of a total amount of work to each processor based on the determined scaling factor of that processor further comprises:
   determining an amount of work that can be handled by an average processor; and
   distributing portions of a total amount of work to each processor based on the determined scaling factor of that processor and a determined amount of work for an average processor.

23. The article of manufacture of claim 22, wherein determining an amount of work that can be handled by an average processor further comprises:
   determining whether the work is I/O bound or CPU bound; and
   determining the amount of work for an average processor based on a selected number of processors and a value based on the determination as to how the work is bound.

24. The article of manufacture of claim 21, further comprising, during run-time, re-determining the portions of work to be distributed to each processor based on a change in resources.

25. The article of manufacture of claim 21, wherein the change in resources is a change in the number of processors.

26. The article of manufacture of claim 21, wherein the change in resources is a change in an amount of storage to be used by the processors.

27. The article of manufacture of claim 21, wherein the multiple processors are on different systems connected by a network.

28. The article of manufacture of claim 21, wherein the multiple processors are part of one system.

29. A method of distributing work to processors in a multi-processor system, the method comprising:
   during bind-time,
      determining a scaling factor for each processor, wherein the scaling factor represents relative processing power in relation to each other processor; and
      distributing portions of a total amount of work to each processor based on the determined scaling factor of that processor and a determined amount of work for an average processor.

30. The method of claim 29, wherein the method further comprises determining an average processing power for each processor before determining a scaling factor.

31. The method of claim 30, wherein each processor has an associated processing power and the average processing power is the sum of the processing powers of the processors divided by the number of processors.

32. The method of claim 31, wherein the scaling factor is determined by the processing power of a processor divided by the average processing power.

33. An apparatus for distributing work to processors in a multi-processor system, comprising:
   a computer having a data storage device connected thereto, wherein the data storage device stores a database containing the partitioned data;
   one or more computer programs, performed by the computer, for, during bind-time, determining a scaling factor for each processor, wherein the scaling factor represents relative processing power in relation to each other processor, and distributing portions of a total amount of work to each processor based on the determined scaling factor of that processor and a determined amount of work for an average processor.

34. The apparatus of claim 33, further comprising means for determining an average processing power for each processor before determining a scaling factor.

35. The apparatus of claim 34, wherein each processor has an associated processing power and the average processing power is the sum of the processing powers of the processors divided by the number of processors.

36. The apparatus of claim 33, wherein the one or more computer programs performed by the computer determine an average processing power for each processor before determining a scaling factor.

37. An article of manufacture comprising a computer program carrier readable by a computer and embodying one or more instructions executable by the computer to perform a method that distributes work to processors in a multi-processor system, in a database stored in a data storage device connected to the computer, the method comprising:
   during bind-time,
      determining a scaling factor for each processor, wherein the scaling factor represents relative processing power in relation to each other processor; and
      distributing portions of a total amount of work to each processor based on the determined scaling factor of that processor and a determined amount of work for an average processor.

38. The article of manufacture of claim 37, wherein the method further comprises determining an average processing power for each processor before determining a scaling factor.

39. The article of manufacture of claim 38, wherein each processor has an associated processing power and the average processing power is the sum of the processing powers of the processors divided by the number of processors.

40. The article of manufacture of claim 39, wherein the scaling factor is determined by the processing power of a processor divided by the average processing power.

41. A method of distributing work during bind-time to processors in a multi-processor system, the method comprising:

determining a scaling factor for each processor, wherein the scaling factor represents relative processing power in relation to each other processor;

distributing portions of the total amount of work based on the determined scaling factor of that processor and a determined amount of work for an average processor, wherein the processors having scaling factors that are magnitudes of order larger than the other processors receive all the distributed portions of work.

42. An apparatus that distributes work during bind-time to processors in a multi-processor system, the apparatus comprising:

a computer having a data storage device connected thereto, wherein the data storage device stores a database containing partitioned data;

one or more computer programs, performed by the computer, for, during bind-time, determining a scaling factor for each processor, wherein the scaling factor represents relative processing power in relation to each other processor, and distributing portions of the total amount of work based on the determined scaling factor of that processor and a determined amount of work for an average processor, wherein the processors having scaling factors that are magnitudes of order larger than the other processors receive all the distributed portions of work.

43. An article of manufacture comprising a computer program carrier readable by a computer and embodying one or more instructions executable by the computer to perform a method that distributes work during bind-time to processors in a multi-processor system, the method comprises:

determining a scaling factor for each processor, wherein the scaling factor represents relative processing power in relation to each other processor;

distributing portions of the total amount of work based on the determined scaling factor of that processor and a determined amount of work for an average processor, wherein the processors having scaling factors that are magnitudes of order larger than the other processors receive all the distributed portions of work.

* * * * *